United States Patent [19]
Kinson et al.

[11] Patent Number: 4,870,126
[45] Date of Patent: Sep. 26, 1989

[54] GLASS FIBER REINFORCED POLY(VINYL CHLORIDE) BLEND WITH IMPROVED HEAT DISTORTION AND TENSILE STRENGTH

[75] Inventors: Philip L. Kinson, Brecksville; Edward M. Faber, Avon, both of Ohio

[73] Assignee: The B. F. Goodrich Company, Akron, Ohio

[21] Appl. No.: 112,793

[22] Filed: Oct. 23, 1987

[51] Int. Cl.$^4$ .................. B32B 27/00; C08K 9/00; C08K 9/06; D04H 1/58
[52] U.S. Cl. .................... 524/521; 428/361; 428/391; 428/392; 428/288; 428/290; 428/378; 523/209; 523/213; 523/214; 524/494
[58] Field of Search .............. 428/375, 391, 392, 361, 428/288, 290, 378, 383, 380; 523/209, 213, 214; 524/521

[56] References Cited

U.S. PATENT DOCUMENTS 3,053,800  9/1962  Grabowski et al. ............... 525/86
3,671,378  6/1972  Baer et al. .................... 523/209 X
4,536,360  8/1985  Rahrig ......................... 523/213 X Primary Examiner—Lorraine T. Kendell
Attorney, Agent, or Firm—Alfred D. Lobo; Alan A. Csontos; James R. Lindsay

[57] ABSTRACT

A high temperature PVC resin blend is made by blending from 60 to 85 parts PVC with no more than 40 parts of a ("alpha-SAN") copolymer of alpha-methyl styrene ("AMS"), styrene ("S") and acrylonitrile ("AN") and less than 20 parts by wt additives including stabilizers, antioxidants, lubricants, and processing aids. In addition, an impact modifier may be added. The blend with particularly sized glass fibers, may be thermoformed at an elevated processing temperature and pressure, to provide a reinforced composite in which the PVC is covalently bonded to the glass fiber. The composite has a substantially higher HDT and equivalent tensile strength, compared to that of a similarly reinforced, unblended PVC composite, without sacrificing the novel composite's other desirable physical properties. The glass is sized with an aminosilane coupling agent, and, a polymer film former selected from the group consisting of (i) a polymer with a nitrogen-containing repeating unit such as an amine, amide, ureido, or urethane group, and (ii) a dispersible or emulsifiable epoxide polymer, which composite, upon extraction with THF, and a subsequent XPS examination, yields a Cl(2p)/C(1s) ratio of at least 0.91, and more preferably of at least 1.13. Glass fibers, thus sized, provide cohesive bonding of the resin, so the composite fails in cohesive failure. A unique sequence of mixing the blend ingredients with glass fiber provides optimum properties in the composite. The sequence requires formation of a single phase of PVC and alpha-SAN copolymer before dispersing the glass fibers in the blend.

4 Claims, No Drawings

GLASS FIBER REINFORCED POLY(VINYL CHLORIDE) BLEND WITH IMPROVED HEAT DISTORTION AND TENSILE STRENGTH

BACKGROUND OF THE INVENTION

This invention relates to improving the heat distortion temperature (HDT) and tensile strength of: glass fiber reinforced (GFR) poly(vinyl chloride) (PVC) without vitiating other physical properties of the GFR PVC. More specifically, this invention relates to the improvement of the foregoing properties, inter alia, by blending the PVC with a particular copolymer, reinforcing it with specifically sized glass fiber, and incorporating these components with a unique mixing procedure.

It is known that, with an aminosilane coupling agent and the correct choice of sizing agent, glass fibers may be so strongly bonded to the PVC that a GFR PVC composite formed therewith fails in cohesive failure. By "cohesive failure" we refer to failure of a sample of GFR VC resin due to tearing of resin from resin, rather than tearing of resin from the glass surface ("adhesive failure"). Thus, cohesive failure is predicated upon the resin's properties rather than upon the bond between resin and glass.

Details of the mechanism of the reaction thought to be responsible for the improved physical properties of the aforementioned GFR PVC composite are taught in U.S. Patent No. 4,536,360 to Rahrig, D., the disclosure of which is incorporated by reference thereto as if fully set forth herein. However, the utilization of the Rahrig GFR PVC in applications requiring operation of an article at relatively high temperature under load, is restricted by the limitation of the relatively low HDT of the GFR PVC. Though the HDT of PVC is improved by the presence of the glass, this improvement of HDT in the range from about 10% by weight (wt) to about 30% by wt of glass, based on the total wt of the GFR PVC, is only marginal. For example, the HDT of GFR commercial grade Geon$^R$86 PVC, reinforced with 10% glass is about 165° F. (74° C.), and with 30% glass is about 170° F. (76.7° C.).

An improvement was subsequently made relating to a wider choice of film formers to catalyze the thermal dehydrohalogenation of the VC homopolymer at the fiber-resin interface so as to generate allylic Cl moieties in chains of the homopolymer, which moieties react with the amine groups of the aminosilane. Details of this improvement are taught in copending U.S. patent application Ser. No. 897,437 filed Aug. 18, 198, now U.S. Pat. No. 4,801,627 the disclosure of which is incorporated by reference thereto as if fully set forth herein. However, a wide spectrum of film formers fell far short of providing a noticeable improvement in HDT, or resulted in a noticeable loss in tensile strength, degradation of spiral flow, etc. and failed to fill the need for an inexpensive, durable and rugged GFR PVC composite with relatively higher HDT, at least equivalent tensile strength, excellent wet strength and only a small loss in impact strength, compared to the aforementioned prior art composites. By "equivalent tensile strength" we mean that the measured tensile strength is not less than 90% of that of a similar prior art composite.

By relatively higher HDT we refer to a HDT of at least 80° C. (176° F.) which is about 3° C. (5.4° F.) higher ed according to the '360 patent. The HDT of general purpose grade injection molding PVC resin is about 74° C. (165° F.), and by reinforcing it with 30% glass fibers sized as in the '360 patent, the HDT is about 76.7° C. (170° F.). It must be borne in mind that such GFR PVC having a HDT of less than 170° F. has inadequate tensile strength and creep resistance under load for general purpose applications where the GFR article is exposed to harsh environmental conditions which may reach to about 180° F.. Such a temperature is reached in a closed automobile left in the sun on a summer day in the southern U.S., in northern Africa, or in southeast Asia, temperatures in the range from 76.7°–79.4° C. (170°–175° F.) being more common than those in the range 2° C. (175°–180° F.). Thus, every degree of improvement in HDT resulted in being able to assure the usefulness of a shaped article made from the GFR PVC blend at a higher temperature than prior art materials, without any substantial loss in desirable physical properties. In particular, it was essential that the tensile strength of the Rahrig composites at least be matched, if not improved. Since there is a need for GFR PVC articles which will withstand each progressive incremental degree above 170° F. for such harsh environmental exposure, the subject matter of this invention derived from a deliberate and concerted effort to fill that need.

Since the improvement sought primarily related to maintaining the chemistry at the surface of the glass fiber, which chemistry was known to be effective, it was logical to search for a copolymer which was miscible with PVC. Since the improvement also sought to improve HDT it was logical to seek a copolymer which contributed high HDT to a blend in which it was a component. But the presence of the copolymer could not adversely affect the bonding of the PVC to the glass fibers.

From the foregoing related disclosures it was known that effective bonding relied upon there being a sufficient number of runs of 10 or more C atoms in VC chains to generate an allylic chlorine (Cl) moiety in the VC chain, represented thus:

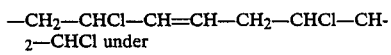

under thermoforming conditions. But it was not known what effect the presence of a blended copolymer would have in this regard, though it was evident that its structure and the relative number of copolymer chains present, would be determinative.

Therefore the choice of the copolymer to be blended with the PVC required that the copolymer not interfere with the ability of the PVC to generate the necessary allylic Cl moiety.

From the foregoing related disclosures it was also known that the enhanced properties of the improved composite (relative to GFR PVC composites which failed in adhesive failure) required the use of an aminosilane coupling (or keying) agent (sometimes referred to as 'finish') which is essential, in combination with certain polymeric film formers used in the production of glass fibers, most preferably from E glass.

Therefore the choice of the copolymer to be blended with the PVC required that the copolymer not interfere with the ability of the aminosilane to provide the necessary chemistry to perform its designated task.

From the foregoing related disclosures it was also known that the enhanced properties of the improved composite (relative to GFR PVC composites which failed in adhesive failure) required the use of a particular "size", namely one which has sufficient basicity as evidenced by a Cl(2p)/C(1s) peak ratio of at least 0.91.

Therefore the choice of the copolymer to be blended with the PVC required that the copolymer not interfere with the basicity of the film former used to provide the necessary chemistry to perform its designated task.

Since the chemistry occurring at the surface of the glass fiber was critical to the successful reinforcement of any blend, the question which presented itself was not whether, but how, that chemistry would be affected by the presence of any copolymer known to provide high HDT at the elevated processing temperature necessary to thermoform, and specifically extrude, or injection mold, PVC resin composites, not to mention that any effect on this chemistry would further be complicated by the presence of a stabilizer without which a PVC resin cannot be effectively thermoformed.

Finally, assuming the "correct" polymer was found for producing the desired GFR PVC blend with improved HDT, one had to recognize that there may be a decrease in tensile strength, spiral flow and impact strength, rather than an overall improvement in any one property, particularly tensile strength.

In view of the foregoing, it seemed logical to search for a suitable copolymer first among those known to be miscible with PVC, and it was convenient to search among these copolymers for those which could be prepared from readily available monomers, and those which were commercially available. In this framework it was not long before the commercially available PVC blends with copolymers disclosed in U.S. Pat. No. 3,053,800 to Grabowski et al claimed our attention. What received even more of our attention was that, despite the clear teaching that the excellent HDT and impact strength of their blends were most useful for rigid shaped articles for use under conditions where high environmental stability was required, there was a singular lack of any suggestion that the blend may be reinforced with any reinforcement of any kind, in any way. This lack of what should have been an opportunity to explore technology known at the time to provide reinforcement of polymers generally, to make an improvement directly in line with the purpose for which the blend was found most useful, led us to believe that the reinforcement of such blends was seriously circumscribed.

Further inspection of the '800 patent for assistance indicates that in the three-component blend of (i) PVC with (ii) the copolymer of alpha-methyl styrene ("AMS"), styrene ("S") and acrylonitrile ("AN") (the copolymer is referred to as alpha-SAN, for brevity), and (iii) the graft copolymer of the polybutadiene latex (rubbery phase), the alpha-SAN and rubbery phases are each critical for the formation of the blend with PVC. Since the rubbery phase of graft copolymer (of AN and S grafted to a PBD latex) is known to exist as a discontinuous rubbery phase in PVC, it was concluded that in a blend of the three components, alpha-SAN provided the continuous phase while PVC and the graft copolymer existed as the discontinuous phases. It seemed highly improbable that a relatively small amount of alpha-SAN copolymer by itself (that is, without the graft copolymer) blended with a major amount of PVC might provide an essentially single phase having a significantly improved HDT, that is, at least 80° C. (176° F.).

It was in the foregoing framework that we discovered that a GFR blend of PVC and alpha-SAN copolymer would provide a substantially single phase which could be reinforced with a particularly sized glass fiber to provide a GFR composite of the blend having a HDT of at least 80° C. (176° F.). In such a composite, the PVC preferentially wets the glass to produce desirable cohesive bonding resulting in improved tensile strength, only if the amount of alpha-SAN copolymer in the blend was maintained in the narrowly defined range of from 15 to about 40 phr (parts by weight (wt) per 100 parts of blended resin). An amount less than 15 phr produces no substantial improvement of HDT, and an amount greater than 40 parts produces a brittle composite with unacceptably low impact strength.

Though impact modification of PVC by using a specific combination of impact modifiers, namely the ABS graft copolymer and the alpha-SAN copolymer, was the sole thrust of the '800 patent, our invention provides a PVC blend with excellent HDT and tensile, in addition to good spiral flow and retention of tensile and impact strength after long exposure to water. These properties, namely tensile and resistance to water, derive from the cohesive bonding we obtain, which only Rahrig suggested.

Having thus arrived at a composition of a GFR PVC blend which would meet the criteria for use under harsh environmental conditions when injection molded or compression molded without an impact modifier, it became evident that an extrusion grade blend would require a compatible impact modifier. Since it was known that the acrylonitrile, butadiene, styrene graft copolymer of the '800 patent provided the impact performance in that blend because there was good "wetting" of the non-rubbery phase it seemed that it would lend itself particularly well as a suitable impact modifier. However, we found that the wetting was not good enough to provide the desired morphology and chemical reactions required to produce reliable and reproducible cohesive failure in a composite. Hence it became necessary to provide a more suitable impact modifier, which we have done.

SUMMARY OF THE INVENTION

It has been discovered that a resin blend comprising from 60 to 85 parts by weight (wt) of PVC with no more than 40 parts by wt of a copolymer of alpha-methyl styrene ("AMS"), styrene ("S") and acrylonitrile ("AN"), and less than 20 parts by wt additives including stabilizers, antioxidants, lubricants, and processing aids, may be thermoformed with particularly sized glass fibers at an elevated processing temperature to provide a reinforced composite in which the PVC is covalently bonded to the glass fiber so as to have a substantially higher HDT and substantially equivalent tensile strength compared to that of a similarly reinforced unblended PVC composite, without sacrificing other desirable physical properties of the novel composite.

It is therefore a general object of this invention to provide a GFR PVC composite consisting essentially of a PVC blend with an alpha-SAN copolymer, the blend containing a stabilizer against degradation during thermoforming, in which composite the glass fibers are sized with (i) an aminosilane coupling agent, and (ii) a basic film former, more basic than poly(vinyl acetate) ("PVA"), present in an amount sufficient to catalyze the thermal dehydrohalogenation of the PVC homopolymer at the fiber-resin interface so as to generate allylic Cl moieties in chains of the homopolymer, which moieties react with the amine groups of the aminosilane. The size is most conveniently coated on the fibers from a sizing solution, dispersion or emulsion containing the coupling agent and film former.

It is also a general object of this invention to provide a surprisingly effective sequence of mixing for preparing a GFR blend of a major amount of PVC and a minor amount of a copolymer of AMS, S and AN, reinforced with from 10 to 30 parts by wt of glass fiber sized with an aminosilane coupling agent, and, a polymer film former selected from the group consisting of (i) a polymer with a nitrogen-containing repeating unit such as an amine, amide, ureido, or urethane group, and (ii) a dispersible or emulsifiable epoxide polymer, which composite, upon extraction with THF, and a subsequent XPS examination, yields a Cl(2p)/C(1s) ratio of at least 0.91, and more preferably of at least 1.13, the sequence requiring that the PVC and copolymer be homogeneously blended into a single phase, then substantially homogeneously dispersing the glass fibers in the blend.

It is still another object of this invention to provide pellets of the foregoing GFR PVC homopolymer which may be thermoformed into a shaped article which is characterized by a HDT of at least 80° C. (176° F.), excellent dry strength, and also excellent wet strength after 168 hr (hours) of exposure to 50° C. (122° F.) water; which fails in cohesive failure; and, which has a higher tensile strength, and at least substantially equivalent HDT compared to that of an identical GFR PVC composite prepared with a different mixing sequence.

Other objects and advantages of the invention will be evident to one skilled in the art from the following detailed description of the invention.

DETAILED DESCRIPTION OF PREFERRED EMBODIMENTS

In the most preferred embodiment of the invention the PVC homopolymer used in the PVC-copolymer resin blend is obtained by either the mass or suspension polymerization techniques, in the form of porous solid macrogranules. By "copolymer" I refer hereinafter to alpha-SAN. Macrogranules of PVC typically have an average diameter in excess of 20 microns, with a preponderance of particles in excess of 50 microns in diameter. Suspension polymerized PVC desirably has a porosity in the range from about 0.1 to about 0.35 cc/g, a surface area in the range from about 0.6 $m^2/g$ to about 3 $m^2/g$, and an inherent viscosity in the range from about 0.46 to about 1.2, that is, having a relatively high molecular weight. The mol wt may be related to its inherent viscosity which is determined as taught in U.S. Pat. No. 4,412,898. The most commonly used PVC resins have an inherent viscosity in the range from about 0.53 to about 1.1, or slightly higher, and are referred to as "rigid PVC". Such a resin is commercially available from The B. F. Goodrich Company under the $Geon^R86$ or 110X377 designations.

It is well known that the key to providing satisfactory strength in a GFR PVC composite is the proper choice of "size" or "sizing" on the glass fibers which are coated with an aqueous sizing solution, suspension, or emulsion consisting essentially of water in which is dispersed a coupling agent, film former, lubricant, surface Z5 active agent, "antistat", plasticizer and the like, sometimes with a water-soluble colloid to provide the necessary stability for the dispersed polymeric film former. It is most important to use the correct combination of coupling agent and film former in the "size".

Glass fibers sized for use in our invention may be used in strands, rovings, tow or yarns, which are treated specifically for use in a GFR thermoplastic resin. Unsized glass fibers are also referred to as untreated, pristine, or bare glass glass.

Glass fibers for use in this invention are conventionally sized with known aminosilane coupling agents and film formers, surfactants, lubricants and the like, but the fibers have unexpectedly shown an improvement in HDT, tensile strength, and spiral flow of a thermoplastic PVC-alpha-SAN copolymer blend shaped into an article of arbitrary shape reinforced with the fibers. When such a composite containing 30 wt % glass is molded from a typical $Geon^R$ injection molding PVC-alpha SAN blend without an impact modifier, the composite has a HDT (ASTM D 648) of at least 80° C., a minimum tensile strength (ASTM D 638) of about 12,000 psi, and an notched Izod impact at room temperature (ASTM D 256) of about 1.0 ft.lb/in$^2$. Such strength was never before deliberately or reproducibly attained, except in the aforesaid '360 Rahrig patent, but the annealed HDT of the composite was only as high as 76.7° C. (170° F.).

All references to HDT herein refer to annealed HDT, to minimize differences due to residual stresses such as remain in an injection molded, extruded, compression molded, or otherwise thermoformed composite sample tested. All samples were annealed at 70° C. for 24 hr.

Though the type of glass, and the diameter of the fibers is not critical, relatively soda-free lime-aluminum borosilicate glass, such as "E" and "S" glass is preferred, drawn into filaments having a diameter less than 20 microns, preferably from 10 to about 16 microns.

The length of the filaments, and whether they are bundled into fibers and the fibers bundled, in turn, into yarns, ropes or rovings, or woven into mats, and the like, are not critical to the invention, but it is most convenient to use filamentous glass in the form of chopped strands from about 1 mm to about 27 mm long, preferably less than 10 mm long. In the composition most preferably used for producing pellets in the size range from about 3 mm to about 8 mm in equivalent diameter, which pellets are used to mold shaped articles, even shorter glass fiber lengths, generally less than 1 mm will be encountered because, during compounding, considerable fragmentation will occur, some fibers being as short as 100 microns.

The best properties of the thermoformed composites are obtained when the glass fibers are present in an amount in the range from about 5% to about 50% by wt, based on the wt of combined glass fibers and resin; and the fibers are in the range from about 500 microns to about 1 mm long. It will be appreciated that less than 5% by wt fibers has little reinforcing value, and more than about an equal part by wt of glass fibers, relative to the amount of PVC resin, results in a mixture which cannot be satisfactorily processed.

The most widely used size for glass fibers used in GFR composites for general purpose reinforcing of resins contains a suspension of poly(vinyl acetate) particles in an aqueous medium. Polyesters, epoxides, poly(methyl methacrylate) and polystyrene are also used as film-formers sometimes on their own, sometimes as separate additives to the size, and sometimes as a copolymer with poly(vinyl acetate). No film former was considered to have a reactive or catalytic function in the composite.

The essential qualification of a size found satisfactorily to fulfil the strengthening function of glass fiber in PVC resin is its (the size's) ability to generate allylic chlorine (Cl) moieties in a zone adjacent the surface of each glass fiber ("fiber-resin interface") where the moieties can react with the primary amine moiety of the coupling agent. This concept is taught and illustrated in the aforementioned Rahrig patent. The specific effective combination disclosed therein for a PVC resin is (a) an aminosilane coupling agent, and, (b) a polymer film former of a ring-opened lower alkylene oxide containing 1 to 4 carbon atoms as an essential component in a repeating unit, for example poly(ethylene oxide:propylene glycol) ("PEO"), optionally containing another copolymerizable component.

The reaction of aminosilane coupling agents with PVC resin occurs between aminosilane and PVC during mixing, and this reaction involves the C=C bonds present in the PVC. Whether these bonds are generated in a sufficient quantity at or near the interface of glass surface and VC resin, to strengthen the reinforcing effect of the glass fibers appreciably, depends on the basicity of the film former and the characteristics of the repeating units in its generic structure.

Any aminosilane coupling agent in which the silanol end couples to the glass leaving an amino-functional end for coupling the PVC, may be used. In addition to the specific ones represented by the formula (I) hereinabove, these may be represented by the general formula

A—Si—B$_3$ wherein A represents an amino-functional radical which bonds with the PVC resin, and, B represents a hydrolyzable radical which leads to bonding of the silane silicon atom to the glass surface through oxane bonds such as —SiOSi—, or —AlOSi— bonds.

In the above formula (II), A typically represents an aminoalkyl radical such as H$_2$NCH$_2$CH$_2$CH$_2$— or H$_2$NCH$_2$CH$_2$NH—CH$_2$CH$_2$CH$_2$ Numerous commercially available aminosilanes represented by formula (I) are disclosed in the Rahrig '30 patent, and the polyaminosilanes such as the diaminosilanes and triaminosilanes are most preferred.

The aminosilane is generally liquid and, because the amount to be deposited on the fibers is relatively small, unhydrolyzed aminosilane is applied to the fibers from a solution, dispersion or emulsion, usually in water, of preselected concentration.

Evaluation of the adhesion of glass fiber to PVC resin in a composite was done by measuring the composite tensile strengths and the Izod impact strengths, both notched and unnotched. In addition, the scanning electron microscopy was used to examine the fracture surfaces of composite specimens to determine when failure was not cohesive failure.

The GFR PVC thermoplastic resin composition in the best mode of this invention consists essentially of from about 60 to about 85 parts, preferably from 65 to 75 parts by wt of PVC resin; from 15 to about 40 parts, preferably from 20 to 30 parts by wt of copolymer; and from 10% to about 35% by wt of glass fibers coated with from 0.2% to about 0.6% by wt of a specified aminosilane, and from 0.2% to about 0.6% by wt of a specified film former. If the amounts of each of the foregoing is substantially outside the specified ranges, the HDT may be relatively high, but the moldability and processability of the glass fibers and resin is reduced, the composite fails in adhesive failure, and both the dry strength and wet strength are vitiated.

The PVC-copolymer blend is typically stabilized with a metallo-organic salt or soap, or an organometallic compound having a carbon-to-metal bond, specifically to counter the thermal dehydrohalogenation of the VC resin during thermoforming, and such a stabilizer is essential in our composition. The stabilizer does not negate the same reaction catalyzed by the film former and/or aminosilane coupling agent. The stabilizer is generally present in an amount less than about 5 phr.

Evidence for the catalytic action of the film former is provided by the rate and extent of HCl evolution when the film former and PVC resin are blended. Addition of the copolymer does not appear to diminish the catalystic action sufficiently to diminish the physical properties obtained without the copolymer.

The generic structure of the film former is not narrowly critical provided it is more basic than PVA which itself is basic. The essential criterion for desirable tensile strength of at least 12,000 psi, is provided by sufficient basicity, as evidenced by a Cl(2p)/C(1s) peak ratio of at least 0.91. Any film former of polyester, polyamine, polypyrrolidone, polysulfide, polyalkylene sulfide, or polymer with aromatic or olefin groups, which film former is sufficiently basic to yield the minimum Cl(2p)/C(1s) ratio, will provide an improvement in tensile strength. More preferred are those which produce at least double the tensile of an unreinforced PVC-copolymer blend, that is, without glass fibers.

Most preferred are film formers which are soluble in an aqueous sizing solution, but the method of coating the glass is not critical provided a sufficient amount of film former is deposited to catalyze a reaction in which allylic Cl moieties in the VC resin chain are covalently bonded to an aminosilane. Less preferred are non-aqueous solutions, because of difficulty dealing with an organic solvent economically, and aqueous dispersions which are binary colloid systems in which particles of polymer are dispersed in a continuous phase (water). More preferred because of better stability are emulsions which are colloidal mixtures of two immiscible fluids, one being dispersed in the other in the form of fine droplets, the one preferably being water.

The alpha-SAN copolymer employed in the production of the PVC blend is prepared by the copolymerization of a minor proportion of vinyl cyanide or a vinyl cyanide type compound, and a major proportion of an asymmetrical alkyl, aryl substituted ethylene. Particularly suitable copolymers of his nature are obtained if the greater part of the total monomer mixture comprises a relatively large quantity of alpha-methyl styrene together with a small quantity of styrene and the lesser part of the total monomer mixture comprises acrylonitrile (AN). The AN preferably comprises from about 20% to about 30% by weight (wt) of the total monomer mixture employed in forming the blending resin. The vinyl aromatic hydrocarbon and/or asym. alkyl, aryl substituted ethylene comprise, correspondingly, from 80% to 70% by wt of the reaction mixture and, as mentioned previously, may consist of alpha-methyl styrene (AMS) exclusively or advantageously may be a mixture of AMS and S in a ratio of from about 50:50 to say 90:10 or higher.

The copolymer is formed as described in the Grabowski '800 patent, the disclosure of which is incorporated by reference thereto as if fully set forth herein. It is advantageous to employ a S-AMS mixture in order to accelerate the emulsion polymerization. Referring only to the binary S-AMS mixture, preferably this contains not more than about 7% to 15% styrene.

As used herein, the term "consists essentially of" means that the named ingredients are essential, though other ingredients which do not vitiate the advantages of the invention can also be included. Such ingredients may include conventional additives such as fillers like talc, mica, clay and the like, light stabilizers, heat stabilizers, antioxidants, pigments and dyes, lubricants and processing aids, as may be required for a particular purpose, it being recognized that the amount of the additive(s) used will affect the physical properties of the thermoformed composite. The combined amount of such additives is generally in the range from about 5 to about 20 phr, preferably from 5 to 10 phr, and are chosen from additives known to be compatible with commercially available general purpose PVC resin. For example, a typical stabilizer is Thermolite 31, a lubricant is Synpro 128 calcium stearate, and a processing aid is Acryloid K-120N, used in amount together totalling about 10 phr.

In addition, there may be included an impact modifier in an amount in the range from 0 to 25 phr, particularly for an extrusion grade PVC. Preferred impact modifiers are those which are graft copolymers of (i) a lower $C_1$-$C_3$ alkyl ester of vinyl cyanide, or of an assymmetrical cyano, alkyl substituted ethylene compound such as methylmethacrylate, and (ii) a vinyl aromatic hydrocarbon or an asymmetrical alkyl, aryl substituted ethylene such as styrene, with (iii) a conjugated diolefin polymer latex, such as polybutadiene latex. Such impact modifiers are preferred because the non-rubber portion of the graft copolymer has better miscibility in the PVC-alpha-SAN copolymer phase than a comparable graft copolymer in which the acrylate is substituted with acrylonitrile, methacrylonitrile, or the like. The latter graft copolymers with acrylonitrile have undesirable immiscibility which adversely affects the desirable properties of the blend particularly with respect to obtaining impact resistance.

The composition of this invention is preferably formed in a multiple ported Buss Kneader having downstream and upstream ports into which latter ports the PVC resin, copolymer and other compounding ingredients are fed. The chopped glass roving is added in the downstream port. The discharge from the Buss kneader may be comminuted into pellets. The pellets may then be extruded or injection molded under essentially the same conditions as those conventionally used for the extrusion or injection molding of PVC.

Alternatively, sections of glass mat, or other shaped glass mat, for example U-shaped channel, or chair seats, may be impregnated with a powder mix of the blend ingredients, and then thermoformed under sufficient heat and pressure to melt the mix and bond the glass mat. Typically, for such impregnation, whether continuous or batch, the PVC, thermal stabilizer and alpha-SAN, optionally with impact modifier and additives, are first dry-mixed to form a homogeneous powder. If the glass mat is to be impregnated with an impact modified blend, the impact modifier is typically added as a powder and dry-mixed with the other ingredients and does not interfere with formation of the single phase of PVC and alpha-SAN.

Glass mat is then 'dusted' or 'filled' with the desired amount of powder mix, generally so that there is from about 30% to about 60% mix evenly spread through the and the dusted mat is then molded under from 100–1000 psi pressure and from 170°–190° C. temperature to form shaped GFR article of PVC blend.

Glass mat, or other shaped glass fiber stock may also be impregnated with a melt of the blend ingredients, such as in pultrusion. Typically, there is about an equal weight of resin and glass fibers in each sheet. Several such sheets cut to a predetermined configuration may be stacked in a mold and conventionally molded at a temperature of 160°–200° C. and a pressure of about 1000 psi (about 30,000 lbf) to form a thick-walled shaped article.

The blend of PVC, copolymer and glass fibers must be prepared in a particular sequence of addition to get the maximum improvement in physical properties of the composite. We found that forming a single phase blend of the PVC and copolymer before adding the glass fibers yielded optimum physical properties. This essential order of mixing, namely adding the glass fibers after formation of the single phase, is demonstrated by the following three experimental runs in which 70 parts of PVC, 30 parts copolymer, and 10 percent by wt glass fibers were blended, each in a different sequence, at 150° C., to yield, when molded, test specimens each having a density of 1.32 gm/cc:

Run 1: PVC and glass fibers are mixed for just long enough to obtain a substantially homogeneous dispersion of the fibers in the PVC, as described in the Rahrig patent. The dispersion was then pelletized, and the pellets were blended with the copolymer before it was extruded. This sequence of mixing would be expected to allow the PVC to coat the glass fibers without interference of the copolymer. The amount of the copolymer coating the glass fibers would be expected to be proportional to the amount of copolymer present. Whatever the surface area of glass coated by the copolymer, its effect would be expected to diminish the bonding of the blend. Reinforcement of copolymer alone with the glass fibers shows poor physical properties. Therefore, coating the glass thoroughly with the PVC, before adding the copolymer would appear to be advantageous.

Run 2: The PVC and copolymer were blended until a single phase is formed and the glass fibers are then mixed in. The time and temperature of blending is the same as that for blending the PVC and glass in Run 1. Since the copolymer is miscible in the PVC the resulting blend is a single phase.

Run 3: The copolymer and glass fibers were first blended until a substantially homogeneous dispersion of the fibers is obtained. The PVC was then added to the mixture. The time and temperature of mixing is the same as that used in Run 1, but the copolymer and glass fibers are mixed first.

In each case, the same weight of pellets was molded into test specimens on a 40 ton Arburg molding press, and the specimens tested under standard ASTM test conditions.

The averaged physical properties of each of seven test specimens are listed in Table I herebelow:

TABLE I

| Physical Property | Run 1 | Run 2 | Run 3 |
|---|---|---|---|
| Tensile strength (psi) | 10,068 | 10,829 | 8,938 |
| Tensile Modulus (psi) | 730,000 | 768,000 | 657,000 |
| Elongation at yield (%) | 2.5 | 2.4 | 2.5 |
| Yield Work (ft-lbs/cu.in.) | 14.2 | 14.1 | 12.6 |
| Flexural Strength (psi) | 16,606 | 17,436 | 14,896 |
| Flexural Modulus (psi) | 644,000 | 682,000 | 598,000 |
| Notched Izod (ft-lb/in) | 0.7 | 0.8 | 0.6 |
| Unnotched Izod (ft-lb/in) | 3.9 | 3.7 | 3.3 |
| Annealed HDT (°C.) | 80 | 80 | 78 |
| Spiral flow (in) | 32.7 | 33.3 | 32.8 |

As is readily evident, the tensile strength of the samples of Run 2 is better than those of samples from runs 1 and 3, and though it is not much better, the difference is both significant and substantial. The same is true for the spiral flow. HDT of all samples is at least 4° C. (7° F.), and generally about 10° C. (18° F.) higher than that of a Rahrig composite containing the same amount of glass fibers (10% by wt) with the same size, and using the same PVC and combination of stabilizer, lubricants, etc.

In the following Table II is a comparison of the physical properties of the composites of this invention with those of the Rahrig '360 patent, and it is seen that the excellent properties of the prior art composites are substantially preserved. The values listed are the averaged physical properties of composite samples prepared from typical commercially available Geon$^R$ PVC (70 parts) blended with the alpha-SAN copolymer (30 parts) free of impact modifier, for use in injection molding applications in which the recommended melt temperature is the same for all samples, namely in the range from 196°–204° C. (385°–400° F.).

TABLE II

| | Glass content of blend, % by wt | | | | | |
|---|---|---|---|---|---|---|
| | Rahrig '360 | | | This invention | | |
| | 10 | 20 | 30 | 10 | 20 | 30 |
| Tensile strength, psi × 10$^3$ | 10.5 | 12.8 | 13.9 | 10. | 11.1 | 12.2 |
| Tensile modulus, psi × 10$^4$ | 56. | 96. | 129. | 66. | 90. | 122.5 |
| Elongation, % | 6.0 | 2.7 | 2.0 | 3.3 | 2.4 | 1.5 |
| Flexural strength, psi × 10$^4$ | 64. | 97. | 119. | 65. | 96. | 120. |
| Izod, notched, ft-lb/in | 0.8 | 1.0 | 1.1 | 0.8 | 1.0 | 1.0 |
| @ −40° C. | 0.7 | 0.8 | 0.9 | 0.8 | 1.0 | 1.0 |
| Specific gravity | 1.43 | 1.5 | 1.57 | 1.31 | 1.40 | 1.49 |
| HDT (annealed) 264 psi, °F. | 167 | 167 | 169 | 185 | 185 | 185 |
| Coeff of Therm Exp*, × 10$^{-5}$ | 2.0 | 1.3 | 1.2 | 2.2 | 1.7 | 1.2 |
| Relative Spiral Flow, in. | 32 | 28 | 25 | 32 | 28 | 25 |

*in/in °F.

We claim:

1. In a thermoplastic composition of a glass fiber reinforced blend of poly(vinyl chloride) and a copolymer blended therewith particularly well-adapted to be thermoformed, the improvement consisting essentially of
   (a) from about 60 parts to about 85 parts by weight (by wt) of poly(vinyl chloride) resin per 100 parts of said blend in which the vinyl chloride portion of each repeating unit contains from about 57% to about 67% by wt of chlorine,
   (b) from 15 to 40 parts by wt of a copolymer of 20% to 30% by wt acrylonitrile with 80% to 70% by wt of a mixture comprising a major portion by wt alpha-methyl styrene and a minor portion of styrene, said copolymer forming a single phase with said poly(vinyl chloride),
   (c) from 5 to about 20 parts by wt, combined, of a stabilizer, lubricant, processing aid and impact modifier, and,
   (d) from about 10% to about 30% by wt of glass fibers having a diameter less than about 20 microns, wherein said glass fibers are coated with a size consisting essentially of (i) an aminosilane coupling agent having a reactive amine moiety which upon reaction with said poly(vinyl chloride) results in a compound having a peak in a portion magnetic resonance spectra at 5.65 ppm, and (ii) a polymer film former having a basicity greater than that poly(vinyl acetate) and sufficient to leave enough said resin coupled to said fibers after thermoforming, to yield a ratio of total chlorine to carbon Cl(2p)/C(1s) of at least 0.91, measured as the ratio of areas under the peaks, after extraction of said composition, after thermoforming, with tetrahydrofuran.

2. The glass fiber reinforced blend of claim 1 wherein a composite molded from said glass reinforced blend has an annealed heat distortion temperature of at least 80° C. and fails in cohesive failure.

3. The glass fiber reinforced blend of claim 2 wherein said poly(vinyl chloride) has an inherent viscosity in the range from about 0.46 to about 1.1, said aminosilane is present in an amount in the range from 0.2% to 0.6% by wt based on 100 parts of pristine glass fibers; and, said film former is selected from the group consisting of amine, amide, aminimide, ureido and urethane, and is present in an amount in the range from 0.2% to 0.6% by wt.

4. The glass fiber reinforced blend of claim 3 wherein said mixture consists essentially of about 90% by wt alpha-methyl styrene and correspondingly, 10% by wt styrene.

* * * * *